United States Patent [19]

Kawada et al.

[11] Patent Number: 4,748,360

[45] Date of Patent: May 31, 1988

[54] ROTOR FOR A SYNCHRONOUS MOTOR

[75] Inventors: Shigeki Kawada; Yoichi Amemiya; Masatoyo Sogabe, all of Hachioji; Noboru Iwamatsu, Hino, all of Japan

[73] Assignee: Fanuc, Ltd., Yamanashi, Japan

[21] Appl. No.: 41,944

[22] Filed: Apr. 24, 1987

Related U.S. Application Data

[63] Continuation-in-part of Ser. No. 767,586, Jul. 30, 1985, Pat. No. 4,661,736.

[51] Int. Cl.$^4$ ............................................. H02K 21/12
[52] U.S. Cl. ..................................... 310/156; 310/269
[58] Field of Search .............................. 310/152–156, 310/269, 162–165

[56] References Cited

U.S. PATENT DOCUMENTS 3,696,260 10/1972 Lace ....................................... 310/156
4,406,958 9/1983 Palmero et al. ................. 310/156 X
4,661,736 4/1987 Kawada et al. ...................... 310/156

Primary Examiner—Donovan F. Duggan
Attorney, Agent, or Firm—Armstrong, Nikaido, Marmelstein & Kubovcik

[57] ABSTRACT

A rotor for a synchronous motor, having a plurality of first magnetic poles formed by a plurality of permanent magnets respectively and disposed at practically equal circumferential intervals on the outer circumference of a yoke fixed to a rotatable motor shaft, and a second magnetic pole projecting radially from the yoke adjacently to each first magnetic pole and the second magnetic pole wherein the shape of the pole face of each first magnetic poles are in a circular arc and the shape of the pole face of each of second magnetic pole is determined by a given equation so that the magnetic flux distribution established by a pair of the first magnetic pole and the second magnetic pole is substantially equivalent to a sinusoidal magnetic flux distribution in the sweeping effect by the armature coils of each phase of the stator.

4 Claims, 4 Drawing Sheets

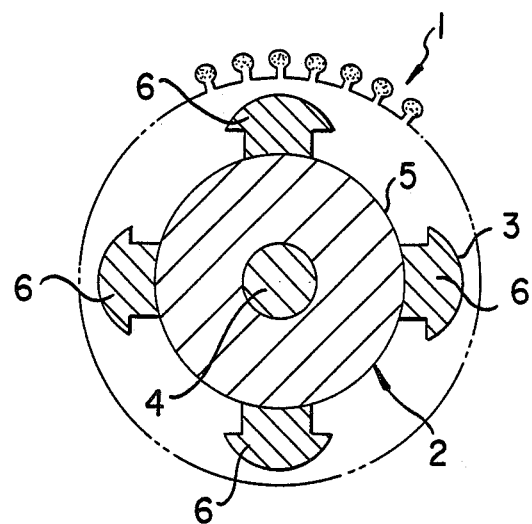
FIG. IA
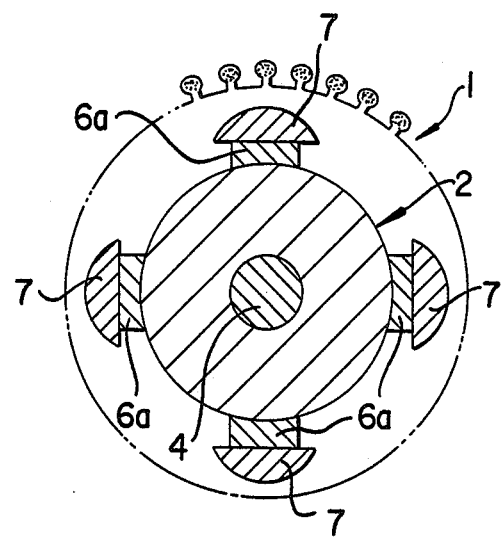
FIG. IB

ROTOR FOR A SYNCHRONOUS MOTOR

This application is a continuation-in-part of application Ser. No. 767,586, filed July 30, 1985, now U.S. Pat. No. 4,661,736, and relates to a rotor for a synchronous motor.

BACKGROUND ART

Among synchronous motors, a salient-pole synchronous motor having a rotor including permanent magnets as salient poles and disposed rotatably inside a stator having excitation coils of a plurality of phases for producing a revolving magnetic field is well known. In such a salient-pole synchronous motor, it is necessary that the field magnetic flux distribution due to the salient poles of the rotor, which interacts with the stator having an armature flux distribution of a sinusoidal waveform, be a sinusoidal waveform. One of the measures taken to set up such a magnetic field distribution of sinusoidal waveforms requires that the form of the pole face of each magnetic pole be decided so that $$G_l = G_{min}/\cos\theta$$

where $G_l$ is the gap length between the inner surface of the stator and the pole face of each magnetic pole of the rotor, $G_{min}$ is the minimum gap length along the axis of the magnetic pole, and $\theta$ is an angle to the right or to the left from the axis of the magnetic pole.

As illustrated in FIG. 1A, when the magnetic poles of a salient-pole synchronous motor are constituted only by permanent magnets, a rotor 2 rotatably disposed inside a stator 1 needs only permanent magnets 6 attached in the form of salient poles to the outer circumference of a spider 5 attached to a motor shaft 4, and hence the rotor 2 can be easily assembled. However, forming the permanent magnet 6, in general, is difficult, and forming a salient pole having a pole face 3 of the shape capable of establishing a magnetic flux distribution of a sinusoidal waveform is very difficult.

Accordingly, as illustrated in FIG. 1B, a widely employed rotor has a construction in which the projecting end face of a permanent magnet 6a is formed in a flat plane or in a plane of a circular arc, which can be easily formed, and a yoke piece 7 having a surface of a form capable of establishing the above-mentioned magnetic flux distribution of a sinusoidal waveform is attached to the projecting end face of the permanent magnet 6a. Since the yoke piece can be easily formed, this construction is capable of establishing a magnetic flux distribution of a sinusoidal waveform. However, this construction is complicated when assembled, reduces the mechanical accuracy and strength of the rotor, and requires an increased manufacturing cost.

DISCLOSURE OF THE INVENTION

In application Ser. No. 767,586, there is shown and described a rotor for a synchronous motor, rotatably supported inside a cylindrical stator provided with armature coils having a plurality of phases, comprising: a motor shaft; yoke means fixed to the motor shaft; a plurality of first magnetic poles formed by a plurality of permanent magnets fixedly disposed on the circumference of the yoke means at practically equal circumferential intervals; a plurality of second magnetic poles each projecting radially from the yoke means and disposed between the adjacent first magnetic poles; and a magnetic poles configuration in which the shape of the pole face of the second magnetic poles is decided dependent on the fixed form of the pole face of the adjacent first magnetic pole so that the distribution of the field magnetic flux set up by a pair of the adjacent first magnetic pole and the second magnetic pole is practically equivalent to a sinusoidal magnetic flux distribution in respect of the sweeping effect by the armature coil of each phase.

As mentioned above, in a salient-pole synchronous motor, it is necessary that the field magnetic flux distribution is a sinusoidal distribution in order to ensure smooth movement of the rotor, which means that the magnetic flux swept by the armature coil of the stator as the rotor rotates varies sinusoidally. Accordingly, when it is intended to obtain such an effect by a pair of the magnetic poles, the magnetic flux distribution of each of the paired magnetic poles need not necessarily be sinusoidal. As understood from the description above, in the rotor according to the No. 767,586 application, one of the paired magnetic poles is formed by only a permanent magnet and the other is formed by only the yoke. The pole face of the magnetic pole formed by the yoke is decided so that the magnetic flux distribution set up by both the magnetic pole formed by a permanent magnet and the magnetic pole formed by the yoke is practically equivalent to a sinusoidal magnetic flux distribution in respect of the sweeping effect by the armature coil of each phase of the stator. Accordingly, the shape of the pole face of the magnetic pole formed by a permanent magnet need not be capable of establishing a sinusoidal magnetic flux distribution, and hence the form of the pole face of the same may be, for example, a shape having an axial section of a circular arc, which can be easily formed. Consequently, the machining accuracy and the strength of the permanent magnet are improved. On the other hand, since the machining of the pole surface of the yoke can be easily carried out, a rotor capable of moving smoothly can be manufactured without any difficulty regarding the machining of the parts. Furthermore, since a yoke need not be attached to the surface of the permanent magnet, the rotor has a simple construction and high strength and facilitates assembling.

BRIEF INVENTION DESCRIPTION

In the present invention, which is an improvement in the rotor according to the No. 767,586 application, it has been discovered that by forming the magnetic pole formed by the yoke with an outer face having a shape which does not have an axial section of a circular arc but, rather, is shaped in accordance with a particular formula, magnetic flux distribution much closer to sinusoidal distribution can be obtained and smoother movement of the rotor can be attained.

BRIEF DESCRIPTION OF THE DRAWINGS

The invention of the instant application will be more fully understood from the following description of an embodiment of the invention taken with the appended drawings in which:

FIGS. 1A and 1B are schematic sectional views, respectively, illustrating, by way of example, the construction of conventional rotor for a salient-pole synchronous motor;

DESCRIPTION OF THE INVENTION

Figure 2:
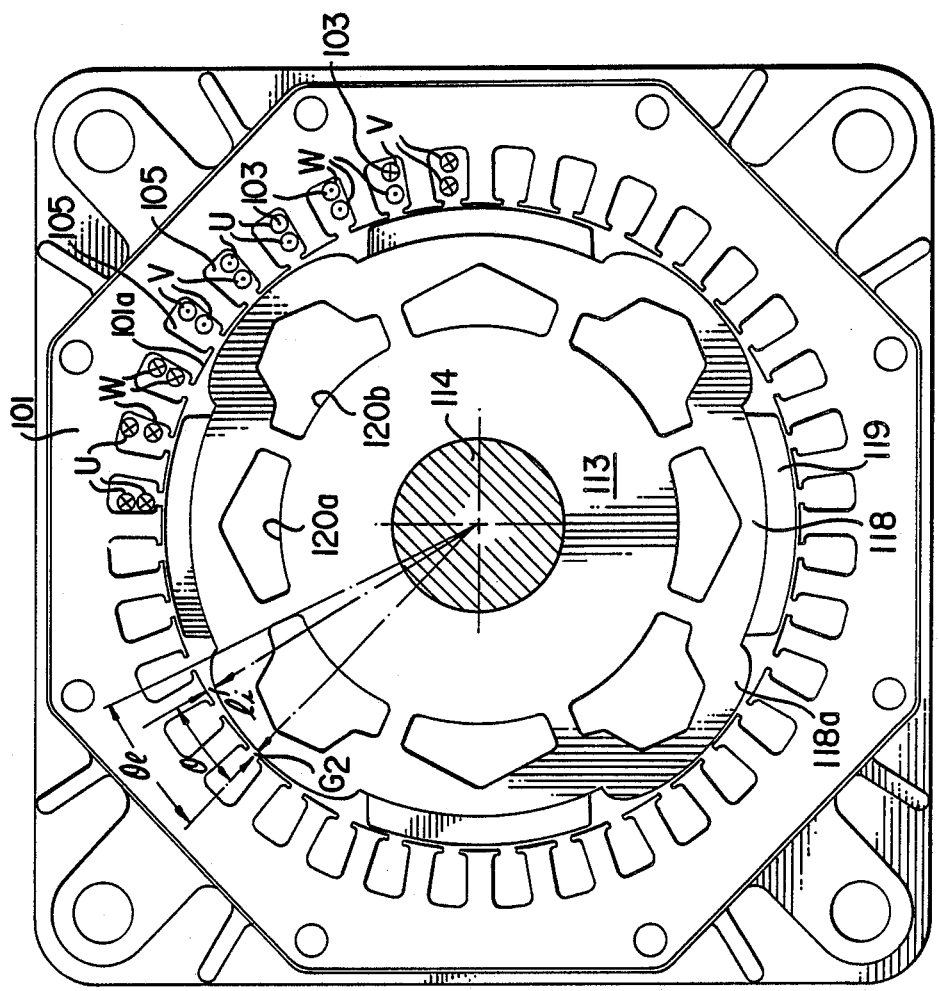
FIG. 2 is a sectional view of a synchronous motor and its rotor according to the present invention.

Referring to FIG. 2, the synchronous motor of the instant invention has a stator 101 and armature coils 103 of a plurality of phases U, V and W, in slots 105, for producing a revolving magnetic field along the inner periphery 101a of stator 101. A rotor 113, having a motor shaft 114 is disposed inside of stator 101 and is rotatably supported in the motor housing by bearing, not shown, at the opposite ends of the motor housing in conventional manner.

Rotor 113 includes a yoke 118 having voids 120a and 120b, for reducing weight and rotor inertia, and magnetic poles 118a projecting radially outwardly from yoke 118 and spaced equally therearound with magnetic poles 119 equally spaced and spaced equally from the ends of magnetic poles 118a, fixed therebetween. The face of each magnetic pole 119 which, for purposes of identity are hereinafter referred to as first magnetic pole, is in the shape of a circular arc coaxial with the inner face 101a of stator 101 and forming an air gap of uniform thickness with inner face 101a of stator 101.

The adjacent first magnetic pole 119 and magnetic pole 118a, identified hereinafter as the second magnetic pole, form a pair of magnetic poles which interact with stator 101 and coil 103 to produce a torque. In this embodiment, four first magnetic poles 119 and four second magnetic poles 118a are employed. Each pair of first and second poles form an N-pole and a S-pole, respectively, to consitute an 8-pole synchronous motor.

The inner surface of first magnetic pole 119 formed by a permanent magnetic is a concave surface of a circular arc and fits the outer circumference of the true circular arc of the yoke 118. A uniform gap is formed along the circumferential direction of yoke 118 between the face of first magnetic poles 119 and the inner surface of stator 101. Permanent magnets 119 are easily machined and can be fixed to yoke 118 with an adhesive or by other suitable means.

The shape of the arc of the face of first magnetic pole 119, i.e. a true circular arc of yoke 113, does not establish a sinusoidal magnetic flux distribution in the motor when coils 103 of stator 101 are energized and thus causes the output torque to ripple.

In the instant invention, the pole face of the second magnetic pole 118a, intermediate first magnetic poles 119, is shaped so that, in combination, first and second magnetic poles 119 and 118a, effectively make the amount of the magnetic flux swept by the armature coil 103 of each phase of the stator 101 equivalent to an amount of sinusoidal magnetic flux swept by the poles. Thus, rotor 113 produces a uniform torque and the motor rotates smoothly.

The shape of the outer face of each second magnetic pole 118a, in the motor of the instant invention, is not in the shape of an arc of the a true circle but, rather, is defined by equation (1), as follows:

$$L_i = \frac{Ga}{\cos\left(\frac{P\theta}{2}\right) \times \left(1 - \frac{\theta}{\theta_e}(1 - C)\right)} \quad (1)$$

where $L_i$ is the gap along the radial line of the rotor through the point on the second magnetic pole face where the gap is to be determined;

Ga is the minimum gap at the center line of the second magnetic pole 118,

P is the number of poles, $\theta$ is the angle, in degrees, between the radial line of the rotor through the center of the second magnetic pole and the radial line of the rotor through the point where the second gap is to be determined, C is a constant selected so as to determine the extent of convexity of the second magnetic pole; and $\theta_e$ is the angle in degrees, between the radial line of the rotor through the center of the second magnetic pole and the radial line of the rotor through the end of the second magnetic pole.

It has been found that a minimum gap, Ga, of between about 0.4 and 0.5 mm is satisfactory for 1 KW motors and a minimum gap Ga of about 1.2 mm is satifactory for 6 KW motors.

By selecting C to be less than 1, the convexity of the second magnetic pole becomes larger.

If the radius of the stator bore is defines as R and radius of each second magnetic pole 118a at an angle $\theta$ as v ($\theta$), the following relationship (2) is established.

$$R - L_i = v(\theta) \quad (2)$$

Thus, for purposes of manufacture, the surface of the second magnetic poles 118a for a given rotor 113 can be ploted from equation 2 and the plot can be used for purposes of manufacturing the rotor.

Figure 3:
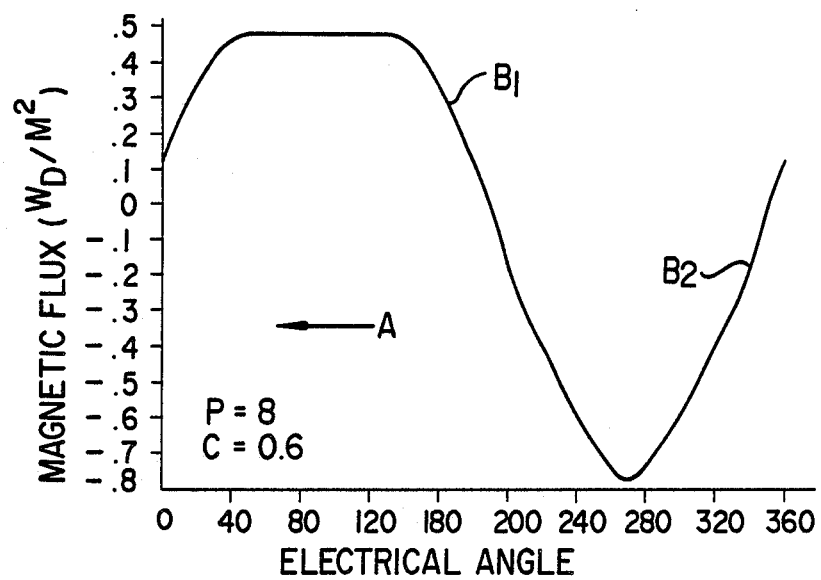
FIG. 3 is a diagram showing the magnetic flux distribution of the motor of FIG. 2.
Figure 4:
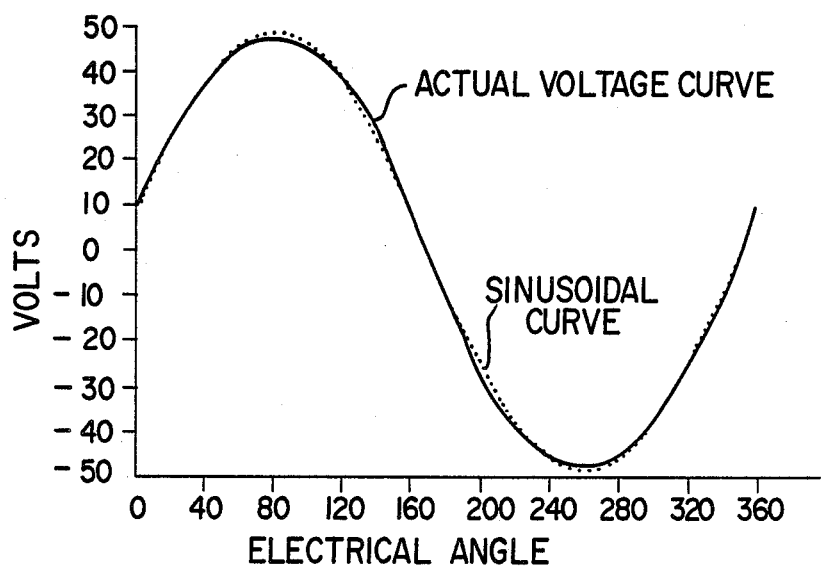
FIG. 4 is a diagram showing the electric voltage obtained through the stator of the motor of FIG. 2.
Figure 5:
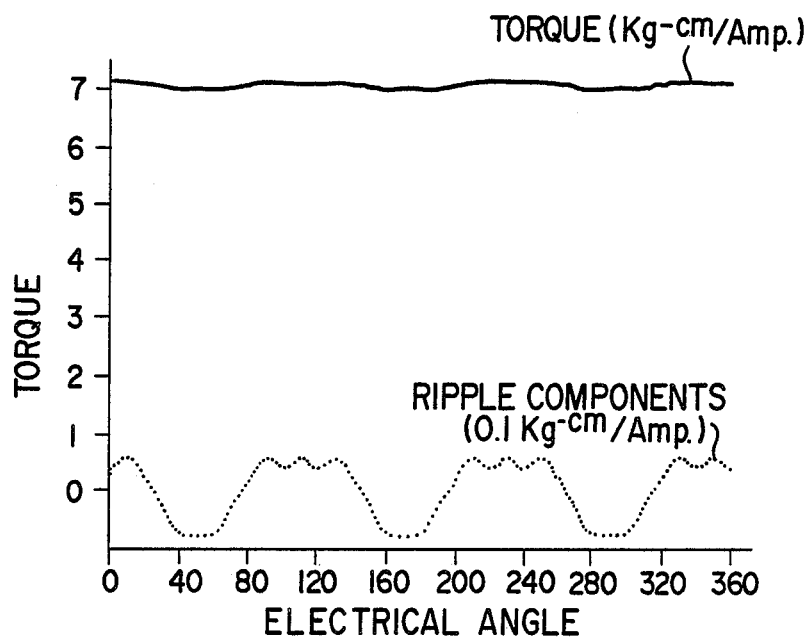
FIG. 5 is a diagram showing the torque at the output shaft of the motor of FIG. 2 and component derived from the torque.

Applying the foregoing equations 1 and 2 to a motor having 8 poles, the constant C selected to be 0.6 and stator winding 103 of stator 101 having U phase, V phase and W phase, as schematically shown in FIG. 2, in FIGS. 3, 4 and 5, the characteristics of such motor are shown.

Referring, first to FIG. 3, showing the magnetic flux distribution, the flux distribution represented at the left half of the chart and designated $B_1$ is due to first magnetic poles 119 while the flux distribution represented at the right half of the chart and designated $B_2$ is due to second magnetic poles 118a.

In FIG. 3, when the first magnetic pole 119 and the second magnetic pole 118a moves relative to stator 101 in the direction of arrow A, FIG. 3, the armature coil 103 sweeps the magnetic fluxes $B_1$ and $B_2$.

Referring to FIG. 4, the curve of the electric voltage through the windings in stator 101 due to the magnetic flux of first magnetic poles 119 and second magnetic poles 118a and U phase, V phase and W phase winding of stator 101, schematically shown in FIG. 2, is shown in solid line as compared to an ideal sinusoidal curve shown in dotted lines. As FIG. 4 clearly shows, the voltage curve attained through the instant invention and the ideal voltage curve substantially coincide.

As best shown in FIG. 5, the torque output at the output shaft 114 of the motor of the instant invention, shown in solid line at the top of FIG. 5, is substantially constant. Therefore, when the ripple components derived from the torque output are multiplied by 10, the ripple content of the torque output is more apparent.

The present invention eliminates torque fluctuations of the rotor, enables the rotor to rotate smoothly, facilitates the machine and assembly of the parts and, through the equations, provides means through which a variety of synchronous motors having different sizes and different numbers of pole pieces can be readily designed and built. Such motor design and building under the instant invention and with such equations can be facilitated through computer use.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:

1. A rotor for a synchronous motor, rotatably supported inside the cylindrical bore of a stator provided in the wall of said bore with armature coils having a plurality of phases, comprising: a motor shaft; yoke means fixed to said motor shaft; a plurality of first magnetic poles formed by a plurality of permanent magnets fixedly disposed on a circumference of said yoke means at substantially equal circumferential intervals; and a plurality of second magnetic poles each projecting radially from said yoke means and disposed between adjacent said first magnetic poles; the pole faces of the poles of said first magnetic poles being in a circular arc having a uniform first gap between the face of said first magnetic pole and said bore of said stator in a plane perpendicular to the axis of said motor shaft and the pole faces of each of the poles of said second magnetic poles in said plane perpendicular to said axis of said motor shaft having a second gap between the face of said second magnetic pole and said bore of said stator, said second gap increasing along said face of said second magnetic pole from the center of said face in said perpendicular plane to the right and left of said center in accordance with the following equation:

$$L_i = \frac{Ga}{\cos\left(\frac{P\theta}{2}\right) \times \left(1 - \frac{\theta}{\theta_e}(1 - C)\right)}$$

where:
 $L_i$ is the gap along the radial line of the rotor through the point on the second magnetic pole face where the gap is to be determined;
 Ga is the minimum gap along the radial line of the rotor at the point at the center of the second magnetic pole face;
 P is the number of rotor poles
 $\theta$ is the angle, in degrees, between the radial line of the rotor through the center of the second magnetic poles and the radial line of the rotor through the point on the second magnetic pole where the gap is to be determined;
 $\theta_e$ is the angle, in degrees, between the is the angle, in degrees, between the radial line of the rotor through the center of the second magnetic pole and the radial line of the rotor through the end of the second magnetic pole; and
 C is a constant selected to determine the convexity of the second magnetic pole.

2. A rotor for a synchronous motor, according to claim 1, wherein said yoke means comprises a hollow cylindrical member formed of a magnetic material and said second magnetic poles are formed integrally with said yoke means so as to project from an outer circumference of said hollow cylindrical member.

3. A synchronous motor comprising a motor housing, a cylindrical stator having a cylindrical bore attached to said motor housing and provided in the wall of said hole with armature coils of a plurality of phases, and a rotor rotatably supported inside said stator by bearings with a gap therebetween, said rotor comprising: a motor shaft, a substantially cylindrical yoke fixed through supporting means to said motor shaft, a plurality of first magnetic poles formed by a plurality of permanent magnets respectively and fixedly disposed on an outer circumference of said yoke at substantially equal circumferential intervals, a plurality of second magnetic poles projecting radially from said yoke and disposed between adjacent said first magnetic poles, the pole faces of the poles of said first magnetic poles being in a circular arc having a uniform first gap between the face of said first magnetic poles and said bore of said stator in a plane perpendicular to the axis of said motor shaft and the pole faces of each of the poles of said second magnetic poles in said plane perpendicular to said axis of said motor shaft having a second gap between the face of said second magnetic pole and said bore of said stator, said second gap increasing along said face of said second magnetic pole from the center of said face in said perpendicular plane to the right and left of said center in accordance with the following equation:

$$L_i = \frac{Ga}{\cos\left(\frac{P\theta}{2}\right) \times \left(1 - \frac{\theta}{\theta_e}(1 - C)\right)}$$

where:
 $L_i$ is the gap along the radial line of the rotor through the point on the second magnetic pole face where the gap is to be determined;
 Ga is the minimum gap along the radial line of the rotor at the point at the center of the second magnetic pole face;
 P is the number of rotor poles
 $\theta$ is the angle, in degrees, between the radial line of the rotor through the center of the second magnetic poles and the radial line of the rotor through the point on the second magnetic pole where the gap is to be determined;
 $\theta_e$ is the angle, in degrees, between the radial line of the rotor through the center of the second magnetic pole and the radial line of the rotor through the end of the second magnetic pole; and
 C is a constant selected to determine the convexity of the second magnetic pole.

4. A synchronous motor according to claim 3, wherein said rotor has four first magnetic poles and four second magnetic poles.

* * * * *